June 23, 1953  R. H. DALTON  2,643,020
SOFT GLASS AND COMPOSITE ARTICLE
Filed March 4, 1946  2 Sheets-Sheet 1
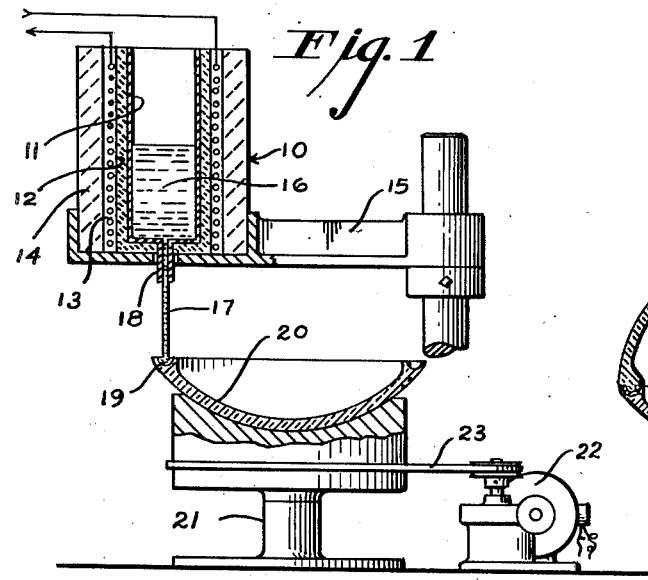
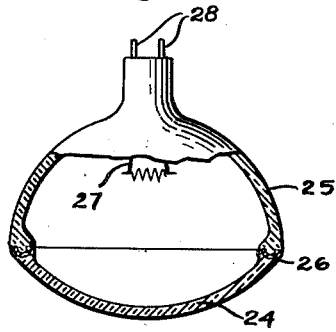
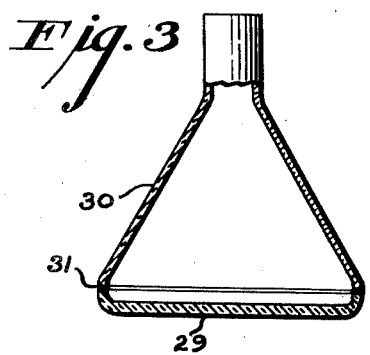
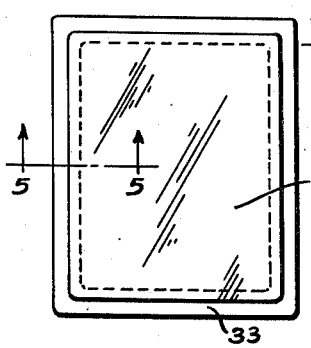
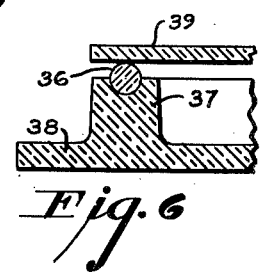
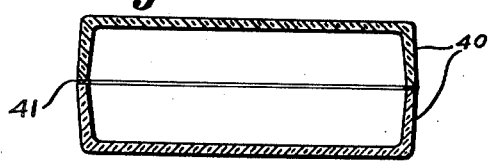
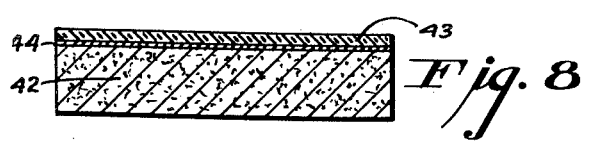
Inventor
ROBERT H. DALTON
By Knight & Fowler
Attorneys June 23, 1953　　　R. H. DALTON　　　2,643,020
SOFT GLASS AND COMPOSITE ARTICLE
Filed March 4, 1946　　　　　　　　　　　2 Sheets-Sheet 2

Inventor
ROBERT H. DALTON
By Knight & Fowler
Attorneys

Patented June 23, 1953

2,643,020

UNITED STATES PATENT OFFICE 2,643,020

SOFT GLASS AND COMPOSITE ARTICLE

Robert H. Dalton, Corning, N. Y., assignor to Corning Glass Works, Corning, N. Y., a corporation of New York Application March 4, 1946, Serial No. 651,818

1 Claim. (Cl. 220—2.1)

This invention relates to the fabrication of glass articles by welding preformed glass parts together and particularly to compositions having special properties which make them suitable as brazing or soldering media for such purposes. The joining together of glass parts by inter-fusion thereof requires a practically perfect match in expansion coefficients of the glass parts to be joined and a careful control of local temperatures in and near the joint. A high degree of manual skill or complex machinery is also essential despite which distortion of the glass parts adjacent to the joint invariably occurs.

The primary object of this invention is to provide a fusion weld between glass parts at lower temperature than has heretofore been possible and without distorting the parts at or adjacent to the weld.

Another object is to provide glass compositions for forming such welds.

Another object is to provide glasses having unusually low softening temperatures together with expansion coefficients suitable for uniting soda-lime-silica glasses and other glasses of similar expansion characteristics.

Another object is to provide a method for sealing together glass parts of considerable size or complicated shapes whereby the glass parts are uniformly heated throughout and are not subjected to thermal shock.

Another object is to provide a method for sealing together glass parts which does not require a high degree of manual skill nor the use of complicated sealing machinery.

A further object is to provide fabricated glass articles comprising preformed glass parts joined by a fusion weld of another glass having a lower softening temperature than the glass parts.

Another object is to seal a glass partition within a hollow glass body, such as a glass cell or tube.

The softening temperature of a glass as referred to herein is that temperature at which a thread of the glass, .65 to 1 mm. in diameter and 23 cm. long, will elongate at the rate of 1 mm. per minute when heated throughout the upper 9 cm. of its length. See "A method for measuring the softening temperature of glasses," by J. T. Littleton, Journal of the American Ceramic Society, vol. 10, page 259 (1927).

In order to form a fusion weld between two glass parts without distortion thereof, a small amount of another glass may be employed as a brazing or soldering glass which has such a low softening temperature that it will melt and flow at temperatures considerably below the softening temperature of the glass parts. I have found that for best results the softening temperature of the soft brazing glass should be not higher than the annealing temperature of the glass to be joined therewith and preferably should be 200° C. or more below the softening temperature of the latter. Annealing temperature is that temperature at which all strain in the glass is released in about fifteen (15) minutes. See "A method for determining the annealing temperature of glass," by Littleton and Roberts, Journal of the American Optical Society, vol. 4, page 224 (1920).

The soft brazing glass will, of course, differ in composition from the glass parts to be joined. Ingredients which are most effective in lowering the softening temperature of glass comprise the alkali metal oxides, boric oxide, lead oxide, etc. The amount of the alkali metal oxides which may be employed for this puropse is limited by the desired expansion coefficient of the glass because the alkali metal oxides increase the expansion coefficient more than any other material. Lead oxide also causes a substantial increase in the expansion coefficient. All such ingredients, when used in very substantial amounts tend to lower the chemical durability of the glass or its resistance to attack by water and chemical reagents. Materials, such as alumina, which increase the chemical durability of glass generally have a hardening effect and tend to raise its expansion coefficient as well as its softening temperature.

I have found that in glasses which consist essentially of PbO, $B_2O_3$ and $SiO_2$, and in which the PbO exceeds 50%, the substitution of $Al_2O_3$ for $SiO_2$ unexpectedly lowers the expansion coefficient of the glass (and in some cases also its softening temperature) and at the same time improves its chemical durability and resistance to devitrification. This is unusual, because it is well known that $SiO_2$ is very effective in lowering the expansion coefficient of glass and removal of $SiO_2$ ordinarily raises the expansion coefficient.

I have further found that the lowering of the expansion coefficient, which is thus brought about by the substitution of $Al_2O_3$ for $SiO_2$, may be compensated by the addition of more PbO. Since PbO tends to soften the glass while raising its expansion coefficient, the net result is that replacement of $SiO_2$ by $Al_2O_3$ and PbO permits softening the glass without substantially changing its expansion coefficient.

By such means I have been able to produce glasses which have expansion coefficients between $70 \times 10^{-7}$ and $90 \times 10^{-7}$ per °C. (0° to 300° C.) and which have softening temperatures below 500° C. and as low as 430° C. These new soft glasses are particularly suitable for forming seals between glass parts composed of commercial compositions such as the soda-lime glasses and others of similar expansion characteristics. The softening temperature of commercial soda-lime glass, such as window glass, is in the neighborhood of 700° C. or higher, and the annealing temperatures are above 500° C. The expansion coefficients (0° to 300° C.) of such glasses range from about $80 \times 10^{-7}$ to $100 \times 10^{-7}$ per °C., this range being particularly suitable for forming seals using the new soft glasses, as will later appear. The new glasses have chemical durability and resistance to devitrification adequate for the purposes hereinbefore set forth.

The new glasses on the oxide basis comprise at least three components consisting of PbO, $Al_2O_3$, and one or both of the glass-forming oxides $B_2O_3$ and $SiO_2$. The term "glass-forming oxides," as used herein, refers to those oxides which have the property of forming glasses of and by themselves when cooled from a molten condition. According to the book "Properties of Glass," by G. W. Morey, the outstanding glass-forming oxides are $B_2O_3$, $SiO_2$ and $P_2O_5$, but $P_2O_5$ is not suitable in the present glasses.

The new glasses may contain 60% to 85% PbO, 5% to 15% $Al_2O_3$, 0% to 40% $B_2O_3$, and 0% to 20% $SiO_2$. Preferably, the proportions should be 70% to 80% PbO, 5% to 15% $Al_2O_3$, 5% to 20% $B_2O_3$, and 0% to 10% $SiO_2$, because the latter proportions produce glasses which have softening temperatures less than 500° C. and expansion coefficients between $75 \times 10^{-7}$ and $90 \times 10^{-7}$ per °C., and which are particularly suitable for joining commercial soda-lime and other glasses of similar expansion characteristics.

Preferably, the new glasses consist of the four components PbO, $Al_2O_3$, $B_2O_3$, and $SiO_2$ in the proportions stated above, but minor amounts of other constituents may also be present subject to the following considerations. The amount of such minor constituents preferably should not exceed about 2% to 5% but in some instances may amount to as much as 8% or 10% of the total glass composition. The alkali metal oxides, if present, should not exceed about 1%, because they cause a decided increase in the expansion coefficient of the glass without advantageous gain in softness. Other minor constituents may include oxides of the metals of the second periodic group and bismuth oxide. Fluorine aids somewhat in lowering the softening temperature of the glass but also tends to cause devitrification and to lower its chemical durability if very much of it is present. It may be introduced as lead fluoride, aluminum fluoride or alkali metal fluoride. The following compositions which are expressed in terms of weight percentage as calculated from their batches generally illustrate glasses which are within the scope of the invention

|  | 1 | 2 | 3 | 4 | 5 |
|---|---|---|---|---|---|
| PbO | 75 | 44 | 73 | 65 | 70 |
| $Al_2O_3$ | 11 | 11 | 11 | 10 | 10 |
| $B_2O_3$ | 11 | 11 | 11 | 10 | 10 |
| $SiO_2$ | 3 |  |  | 10 | 10 |
| $PbF_2$ |  | 28 |  |  |  |
| CdO |  |  | 5 |  |  |
| $Bi_2O_3$ |  | 6 |  | 5 |  |
| NaF |  |  |  |  | .3 |
| $Li_2O$ |  |  |  |  | .1 |
| Softening Temp., °C | 440 | 434 | 438 | 496 | 472 |
| Expansion coefficient per °C.$\times 10^7$ | 85 | 84 | 85 | 74 | 78 |

Composition 1 is particularly suitable for my purpose. In Composition 2 part of the lead is introduced as $PbF_2$, but on the oxide basis the total percentage of lead in this glass is about 71% PbO. In the new glasses the percentage of PbO should not be more than about 17 times the percentage of $Al_2O_3$ and it will be noted that in the above examples it does not exceed seven times the $Al_2O_3$. The high alumina content with respect to PbO is a distinguishing characteristic of the present glasses and is higher than was heretofore believed desirable for soft glasses and glazes of high lead content. As pointed out above, the presence of a relatively high alumina content in the present glasses is largely responsible for their unusually low softening temperatures and other desirable properties.

The above described soft glasses may be applied to the junction of preformed glass parts in various ways for the purpose of joining such parts with a permanent fusion weld without distortion of the parts. Preferably, the soft glass is melted and flowed in a small stream on to one of the surfaces to be joined, the glass part being heated at least sufficiently to prevent breakage from thermal shock. This is advantageously accomplished while the glass part is still hot from holding or pressing. The hot surface to be coated may alternatively be dipped into the soft glass, the latter being either molten or pulverized. In the latter case the powdered soft glass becomes sticky and adherent from the heat of the glass part. Thin rods, strips, or washers of the soft glass may be inserted between the parts to be joined and subsequently heated in place or a rod of the soft glass may be rubbed or smeared on to the hot surface to be joined. Other methods of applying the soft glass to the joints of the glass parts may include applying it either as a molten liquid or as a slurry comprising a powder in a vehicle such as cellulose nitrate solution, by flowing, brushing, or spraying, or by means of a coating roller. The powdered soft glass may be attached in appropriate patterns to paper or other suitable backing material by means of an adhesive and thereafter may be applied to the surface to be coated. Preformed gaskets or washers composed of the soft glass or of a sintered powder thereof may be employed. The part to be coated may also first be coated with an adhesive and dipped into the powdered soft glass to obtain a coating thereof.

The glass parts to be joined, having thus been coated with the soft glass, are brought together and heated sufficiently to cause the soft glass to flow and fill the joint, but insufficiently to soften the glass parts themselves. Heating is preferably accomplished by passing the article through a lehr or oven, whereby the composite article when finished is also annealed. However, it may also be accomplished through the application of local heat sufficient for the purpose by the use of a flame, or by electric inductive heating, or, in the case of thin articles, by the application thereto of a hot metallic body in the neighborhood of the seal.

The amount of the soft glass which is required to fill the joint is relatively small and will depend upon the character of the surfaces to be joined. With surfaces which are formed so as to fit closely and accurately a very thin layer of the soft glass suffices to make a satisfactory seal. With less closely fitting joints, a larger amount of the soft glass is required, the amount in any case being sufficient to fill all irregularities of the junction. When the parts fit closely and the layer of the soft glass is very thin, the average values of the expansion coefficient of the soft glass between room temperature and the setting point temperature and the expansion coefficient of the glass parts (0° to 300° C.) need not match as closely as when the layer of the soft glass is relatively thick. In the former instance it suffices if the expansion coefficient of the soft glass (averaged as above) is within about 20 or $30 \times 10^{-7}$ per °C. of that of the glass parts. The setting point temperature is the temperature below which the glass has insufficient plastic flow to relieve strains set up in the glass during cooling. For most glasses this temperature is approximately 10° to 20° C. below their annealing temperatures. I have found that the expansion coefficient (0° to 300° C.) of the soft glass should preferably be about 2 to $15 \times 10^{-7}$ °C. below that of the glass parts to be joined. This is because a strain-free seal between two glasses of different softening temperatures requires that the overall thermal elongation per unit length between room temperature and the setting point temperature of the softer glass should be the same for both glasses. Under these conditions, the expansion coefficients (0° to 300° C.) of the new soft glasses are about 2 to $15 \times 10^{-7}$ per °C. less than that of commercial soda-lime silica glass and other glasses of similar expansion characteristics. In general, the soda-lime silica glasses which can be joined by means of the new soft glasses comprise the approximate range of compositions including 70%–76% $SiO_2$, 13%–18% alkali metal oxides ($R_2O$), 8–14% CaO+MgO and 1%–3% $Al_2O_3$. Other glasses of similar expansion characteristics such as lead glasses, barium crown glasses, etc., may also be used.

For a better understanding of the use and application of the new soft glasses to preformed parts of soda-lime glasses for welding them together and of various glass articles made thereby, reference is had to the accompanying drawings in which:

Fig. 1 is an elevation partly in section of an apparatus for producing glass articles provided with a sealing strip of soft glass in accordance with the invention.

Fig. 2 is an elevation partly in section of a lamp comprising two glass parts joined by a fusion weld of soft glass in accordance with the invention.

Fig. 3 is an elevation partly in section of a cathode ray tube embodying the invention;

Fig. 4 is a plan view of a double window pane made in accordance with the invention.

Fig. 5 is a fragmentary section on an enlarged scale on the line 5—5 of Fig. 4.

Fig. 6 is a fragmentary section on an enlarged scale of a double window pane during welding in accordance with the invention.

Fig. 7 is a sectional view of a hollow glass building block welded in accordance with the invention.

Fig. 8 is a sectional view of a sheet of foam glass faced with a transparent glass sheet welded thereto in accordance with the invention.

Figure 9:
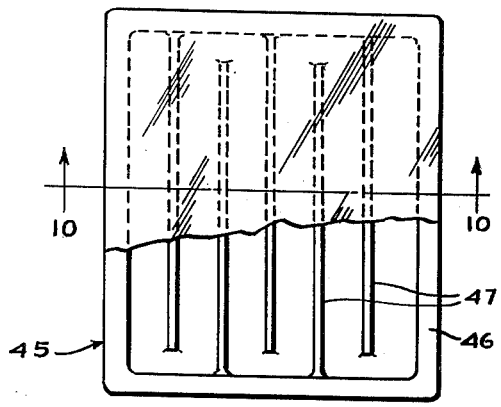
Fig. 9 is a plan view partly broken away of a hollow glass panel for a fluorescent lamp in accordance with the invention.

Fig. 1 illustrates one method of applying the soft welding glass to the edge of a glass part to be welded to another glass part, for example, the glass parts of an all glass automobile headlamp known as a "Sealed Beam" headlamp. A small electric furnace generally designated 10, comprising a platinum liner 11 surrounded by a ceramic refractory shell 12, an electric resistance element 13 and an outer insulating refractory shell 14, is mounted on a swinging support 15. The furnace 10 contains a molten supply of soft glass 16, preferably the composition 1 described above, which issues as a continuous stream 17 from an orifice 18 in the bottom of the furnace 10. The stream 17 falls within a groove 19 provided in the rim of a lens or cover glass 20 for a "Sealed Beam" headlamp which is preheated as mentioned above. The lens 20 is mounted on a support 21 adapted to be horizontally rotated by a motor and reducing gear 22 through a belt 23.

In operation the furnace 10 is swung from an idling position (not shown) into the operating position over the lens 20 so that the stream 17 falls into the groove 19 during one complete revolution of the support 21, after which the furnace 10 is swung aside. This suffices to fill the groove 19 uniformly to a depth less than full and leaves space for the exact registration therewith of a tongue on the rim of the reflector part of the headlamp (not shown) when the reflector is subsequently welded to the lens 20. Thus the invention may provide as an article of manufacture a glass part provided with an integral strip of a soft brazing glass ready for the subsequent joining thereto of another glass part by fusion welding without distortion of the parts.

Fig. 2 illustrates a finished headlamp of the "Sealed Beam" type which comprises a lens 24 similar to the lens 20 of Fig. 1 and fusion welded to a glass reflector 25 by a thin layer 26 of soft glass, the reflector being provided with a filament 27 and electrodes 28.

In Fig. 3 is shown a cathode ray tube comprising an accurately shaped face 29 joined to a conical body 30 by an integral layer 31 of soft glass.

In Figs. 4 and 5, a flat sheet of glass 32 is permanently joined to another sheet 33 by means of a layer 34 of soft glass disposed between the face of the sheet 32 at its border and an upstanding rib of glass 35 with which the sheet 33 is provided. In this case junction of the sheets 32 and 33 may be accomplished as shown in Fig. 6 wherein a rod of soft glass 36 is disposed on an upstanding rib 37 of a glass sheet 38 and another sheet of glass 39 is disposed on the glass rod 36. Welding may be accomplished by passing the assembled sheets of glass through a lehr having a maximum temperature above the softening temperature of the soft glass but below the deformation temperature of the glass sheets. Such a seal would be difficult or impossible to make by conventional flame sealing methods.

In Fig. 7 the two halves of a hollow glass building block 40 are joined by layer 41 of a soft glass disposed between the edges of their rims and integral therewith.

In Fig. 8 a sheet of foam glass 42 is joined by one face to a flat sheet of glass 43, such as window glass by an intermediate layer 44 of a soft glass which is integral therewith.

Figure 11:
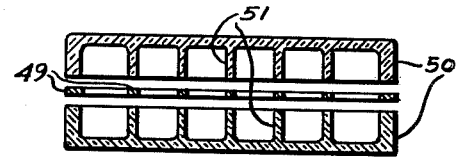
Fig. 11 is a sectional view of a glass panel similar to that shown in Fig. 9 before welding the parts together according to the invention.
Figure 10:
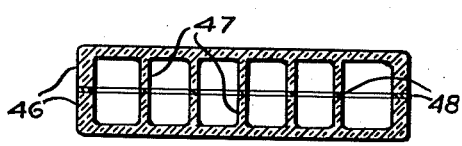
Fig. 10 is a sectional view on the line 10—10 of Fig. 9.

In Figs. 9 and 10, a glass panel generally designated 45, comprises identical upper and lower halves which are provided with rims 46 and projecting ribs 47, the rims and ribs of the two halves being in accurate registration. The two halves are joined by layers 48 of soft glass disposed between the abutting rims 46 and ribs 47 and integrally united therewith. Junction of the two halves may be accomplished as shown in Fig. 11 wherein strips 49 of soft glass are disposed between the respective rims 50 and ribs 51 of two glass parts similar to the two halves of the panel of Fig. 10. The opposing rims 50 and ribs 51 of the two glass parts are brought into contact with the respective intermediate strips 49 and the entire assembly is heated to a temperature sufficient to soften the strips 49 but insufficient to soften the two glass parts after which the assembly is annealed.

The glass panel described in Figs. 9 and 10 is adapted to be converted into a panel type fluorescent lamp by applying to all interior surfaces a coating of fluorescent material and providing two inserted electrodes (not shown), the electric discharge being constrained by the intervening ribs to traverse the longest possible path between the electrodes and consequently to uniformly illuminate the entire panel.

Figure 12:
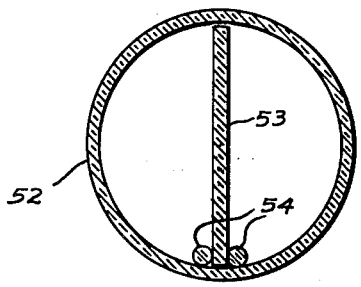
Fig. 12 is a transverse sectional view of a double bore glass tube during fabrication in accordance with the invention.
Figure 13:
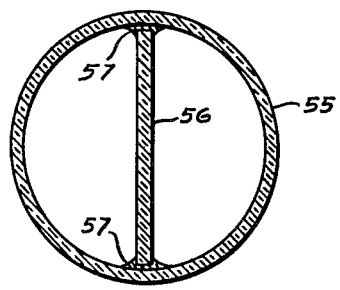
Fig. 13 is a transverse sectional view of a finished double bore tube similar to that shown in Fig. 12.

In Fig. 12 a glass tube 52 is provided with a longitudinally disposed upstanding glass partition 53. Rods 54 of soft glass are longitudinally positioned along the lower edge of the partition 53 in which condition the assembly is heated sufficiently to soften the rods 54 and cause the soft glass to flow and make a uniform joint between the wall of the tube 52 and the edge of the partition 53. In a similar manner soft glass rods may be applied and fused into place at the opposite edge of the partition 53 whereupon a double bore tube is produced similar to that illustrated in Fig. 13 in which a glass tube 55 is provided with a glass partition 56 joined thereto through an integral joint 57 of soft glass.

The invention possesses numerous benefits and advantages, outstanding among which is the ability to form junctions of hard glasses at temperatures below their strain temperatures, the latter temperature being defined as that temperature at which four hours is required to anneal the glass (Littleton and Roberts, Jour. Am. Opt. Soc. vol. 4, p. 224, 1920, above referred to). That is to say, glasses having expansion coefficients within the range specified above and having strain temperatures above the softening temperature of the soft brazing glass of the invention can be joined by means of said soft brazing glass without introducing permanent strain in the composite article and hence avoiding the necessity for annealing the article after the joint is complete. Since hard glasses of high expansion can be strengthened by tempering or chilling to purposely introduce permanent uniform stresses in the glass, the new soft glasses of the invention can be employed to join such tempered glass parts without releasing the stresses.

The new soft soldering glasses also may be advantageously used in the production of glass-to-metal seals in which a glass part having an expansion coefficient in the range $80 \times 10^{-7}$ to $100 \times 10^{-7}$ per ° C. (0° to 300° C.) is joined to a metal part having a similar expansion coefficient by an intermediate layer of the new soft soldering glass.

The new soft glasses described above and composite articles composed in part of such glasses, as also described above, are claimed in application Ser. No. 141,831, filed February 1, 1950, in my name as a division of the instant application.

I claim:

An electric lamp comprising a concave vitreous reflector portion having an inner surface with a reflecting coating, a translucent vitreous cover portion hermetically sealed to the rim of said reflector portion and forming an enclosure therewith, one of said portions having a groove receiving vitreous material having a softening point considerably lower than that of the parts sealed together, the other having a boss received in said groove and embedded in said vitreous material of considerably lower softening point.

ROBERT H. DALTON.

References Cited in the file of this patent

UNITED STATES PATENTS

| Number | Name | Date |
|---|---|---|
| 2,210,489 | Lemmens et al. | Aug. 6, 1940 |
| 2,240,352 | Schmidt | Apr. 29, 1941 |
| 2,393,448 | Armistead | Jan. 22, 1946 |
| 2,417,898 | Armistead | Mar. 25, 1947 |
| 2,464,990 | Plagge | Mar. 22, 1949 |